J. A. POTTER.
PROCESS AND APPARATUS FOR RECOVERING METALS FROM THEIR ORES.
APPLICATION FILED AUG. 19, 1909.

1,026,999. Patented May 21, 1912.
5 SHEETS—SHEET 1.

FIG 1

J. A. POTTER.
PROCESS AND APPARATUS FOR RECOVERING METALS FROM THEIR ORES.
APPLICATION FILED AUG. 19, 1909.

1,026,999.

Patented May 21, 1912.
5 SHEETS—SHEET 5.

UNITED STATES PATENT OFFICE.

JOHN A. POTTER, OF LOS ANGELES, CALIFORNIA.

PROCESS AND APPARATUS FOR RECOVERING METALS FROM THEIR ORES.

1,026,999.   Specification of Letters Patent.   Patented May 21, 1912.

Application filed August 18, 1909. Serial No. 513,608.

*To all whom it may concern:*

Be it known that I, JOHN A. POTTER, a citizen of the United States, residing at Los Angeles, in the county of Los Angeles and State of California, have invented new and useful Improvements in Processes and Apparatus for Recovering Metals from Their Ores, of which the following is a specification.

The present invention relates to an improved process and apparatus for smelting, roasting, calcining, and sintering all grades of ores, earths and the like, the object of the invention being to provide a process and apparatus by which the above results will be obtained with greater economy than heretofore.

In the accompanying drawings.

Referring to the drawing, 1 indicates columns, and 2 indicates girders supporting the floor 3 of a furnace 4, said floor being formed with two basins 5, for receiving the molten metal and slags obtained from the ores. From these basins the molten metal and slags can be drawn intermittently into ladles, as desired, through tap-holes 6, 7. The ore is supplied into hoppers 9, located on the top of charging boxes 10, and passes through the bottom of these hoppers into said boxes from which it is, by means of plungers 11 actuated by eccentrics 12, advanced into deoxidizing or desulfurizing chambers 13, located in the rear of corresponding furnace basins 5. The furnace and deoxidizing chambers are provided with suitable doors 14.

Opening into the rear of the deoxidizing and desulfurizing chamber 13, near the bottom are a series of twyers 15, leading from a twyer flue 16. Opening into the respective ends of the furnace are larger upper conduits 17, 17', and smaller lower conduits 18, 18', the latter being just above the level to which the molten slag rises in the furnace basins.

At the sides of the apparatus, there are provided two vertical series of three regenerative flues 20, 21, 22, 20', 21', 22'. All of these flues connect at the front end of the apparatus with the furnace; namely, on one side, the flues 20, 21, lead to the upper conduit 17, and the lowest flue 22 to the lower conduit 18, and similarly for the flues 20', 21', 22', on the other side, the upper flues 20, 20', being controlled at said front end by slide valves 23, 23'. At the rear end, the flues 20, 21, 22, on one side of the apparatus, connect with a common flue 24, and those 20', 21', 22', on the other side with a flue 24', said flues 24, 24' being controlled by slide-valves 25, 25', and discharging into the bottom of a boiler heating chamber 26, in which is located an annular water drum 27 connected by water tubes 28 with a steam dome 19, so that steam may be generated by the waste heat from the flues. A stack 29 at the top of the boiler produces the necessary draft, and carries off the waste gases. The uppermost flues 20 and 20' connect at the front end, by passages 30, 30', with the twyer flue 16, said passages being controlled by slide valves 31, 31'.

At the rear of the furnace there is provided a pressure fan 32, adapted to be driven by a pulley 33 from any suitable source of power. Said pressure fan is connected on its vacuum side by an upright pipe 34, controlled by a valve 42, with gas supply flues 35. From said flues the gas is drawn by the fan paddles and discharged under pressure into the pressure chamber 36. Thence it passes by a pipe 37 or 37' and through a valve 38 or 38', into the upper regenerative flue 20 or 20', as desired. Gas is also conveyed at ordinary pressure from the upright gas-pipe 34 by a gas-pipe 39 or 39', and through a valve 40 or 40' and into the lower regenerating flue 22 or 22', accordingly as the reversing valve mechanisms are disposed. Sliding doors or valves 41, 41' open or close openings admitting air into the middle regenerating flues 21 or 21' accordingly as the reversing valves are disposed.

The slide valves 23, 23', 25, 25', 31, 31', are opened and shut by being moved up and down, together with the sliding doors 41, 41' and the gas valves 38, 38', and 40, 40', by reason of all being connected by wire cables or chains to or over sheave wheels on a main reversing shaft 44 and on counter shafts 45, 46, 47, 48, 49, 50, so that, by pulling down on a hand chain 51 that passes over a large sheave wheel 52, the shaft 44 is caused to rotate in the desired direction, and the whole reversible valve system is shifted.

The valves 23, 31, or 23', 31', at either side of the apparatus, are, by means of the above described mechanism, operated in unison, so that the upper regenerating flue 20 or 20' at that side is either closed to the twyer passage 30, 30' and open to the furnace, in which case the gases of combustion pass from the latter along said flue to the stack, or is closed to the furnace and open to the twyers, when fuel gas passes in the reverse direction to the twyers.

An air valve 53 for admitting air to the pressure fan 32 may be opened at will by pulling down on a handle on the end of a cord 54 attached to a lever 55, thereby permitting the desired amount of air to pass to the fan, which air is thereby forced into and through the pipes and valves to the flues 21 or 21', as may be desired. A pipe 56, controlled by a valve 57, leads from the chamber 26 to the fan for the purpose of drawing off neutral gases from the interior of said chamber.

The following is the method of using the above apparatus for smelting oxid or carbonate ores, particularly iron oxid ores, so that liquid wrought iron or all grades of steel are produced direct from the iron contained in the ores.

The furnace being first heated to a proper degree for smelting, the mixed ores and fluxes are fed into the hoppers 9, from where they pass into the charging boxes 10, and there form the ore charges which are to be smelted. At this time, fuel gas for the furnace is passing from the gas flue 35 up into the gas pipe 34, then into branch pipe 39', through the fly valve 40' into the regenerative flue 22', where it is preheated, and finds its way up through the conduit 18' into the furnace combustion and melting chamber 4, where it meets heated air coming into the same chamber through the conduit 17'. While this gas is thus passing into the furnace as above described, air is being admitted into the regenerating flue 21' through sliding door valve opening 41', which finds its way after being heated into the furnace combustion chamber through the conduit 17', where it meets the gas flowing through the conduit 18', as above explained. Now, while the fuel gas and air are being conveyed to the combustion chamber, as described above, reducing gas is being admitted through pipe 34 and valve 42 into the fan vacuum chamber, whence it is drawn and compressed by the fan blades and discharged into pressure chamber 36, whence it is forced into branch pipe 37', and through the valve 38' into the regenerating flue 20', where it is highly heated while on its way forward, where it finally encounters the valve 23' which is now closed, and finds its way into the twyer passage 30', passing under the valve 31', which is now open, then accumulating in the flue 16, whence it is unable to escape, as the valve 31 at the other end is closed, so that the heated gas is compelled to pass up into and through twyers 15, into and through the ore charges. Now, this gas has been preheated to a very high degree, say, about 2500° F. and it forms a most perfect medium to preheat the ore charge while passing into and through it. At the same time, since this gas is composed of reducing elements, as hydrogen and carbon, in varying proportions according to its source of supply or manufacture, the hydrogen and carbon contained in the gas attract, attack and combine with the oxygen contained in the heated ore charges, thus producing great heat, and changing the oxids of the ore charges into metallic masses of a spongy, honey-combed character, which are quickly melted into a liquid state by the high heat, about 3500° F., maintained in the melting and combusting chamber 4 of the furnace, which heat is produced, first, by the combination of the reducing gas and oxygen in the ores, second, by that of the fuel gas and air coming into said chamber through the ports 18' and 17', and, third, by the complete combustion of the heated carbon monoxid gas escaping through the fusing, slagging, and deoxidizing ore charges in numerous gas jets, which discharge into the furnace chamber and there come in contact with the excess of heated air that is coming into the chamber through the port 17'. While this deoxidizing, fusing and melting action is proceeding, the feeding mechanism 12 is constantly pushing forward fresh ore charges, and the fusing and liquid metals and slags are constantly flowing down from the fusing ore charges, and finally pass into the furnace basins 5, where they find their respective levels, according to their specific gravity, and whence they are intermittently withdrawn, as desired, through the tapholes 6 and 7, into ladles, by which they may be disposed of as further manufacturing may require. During this time the waste gases are passing from the furnace by the flues 20, 21, 22, to the boiler and stack, thereby highly heating the checker work in said flues.

After a time, say, one hour, it becomes necessary to stop the flow of the ingoing gases and air through the flues 20', 21', 22' and to cause them to pass through the flues 20, 21, 22, and at the same time to reverse the direction of the out-flowing gases of combustion. This reversal is accomplished by the furnace attendant pulling down on the hand chain 51 that passes over the large sheave wheel 52, thereby causing the main reversing shaft 44 to rotate, which raises the valves 23', 25' and 31, while at the same time lowering valves 23, 25, 31', also opening the gas fly valves 38 and 40, and closing the gas fly valves 38' and 40', and at the same time opening the air sliding door 41 and closing the air sliding door 41', thus causing a complete reversal of ports, flues, pipes, and valves, for the gases and air flowing to the combustion chamber 4, and the combusted heated gases flowing to the boiler stack, and in this manner new heats are alternately imparted to the inner portions of the regenerating flues and checker bricks by the waste heat and extracted therefrom by the cold gases and air, thus furnishing a continuous operation and the maintenance of high heat.

Should it be desired to dilute the twyer reducing gas with a neutral gas, for the purpose of increasing its volume, or reducing its richness, the fly valve 57 is adjusted to permit the desired amount of neutral burned gases from the boiler heating chamber 26 to pass into the fan vacuum chamber, where it is mixed with reducing gas now coming into the same chamber from the gas flues 35 and pipe 34, through the gas fly valve 42, which regulates the amount of gas to be mixed with the neutral gas to suit the requirements.

The above description of operation is intended to apply to the method when reducing all classes of oxid and carbonate ores, both the very refractory ores as oxid of chromium, manganese, iron, nickel, copper, and the like, that require high and medium reducing heat to successfully smelt them; and such ores as contain the precious metals, gold, silver, copper, lead, zinc, and the like, or such ores and compounds of metals as require less heat, but require gaseous fuel of a strong reducing character to consume the oxygen and gases contained in the ores and to protect the newly formed metals from oxidation, until they find their proper places in the basin 5. By regulating the heat of the furnace and gases, ores such as the above can be successfully treated and the resulting metals preserved.

When smelting ores containing excess sulfur together with metal compounds, and where a copper, iron and sulfur matte is formed while the earths and fluxes form slags, the mode of operation is the same as described above when smelting iron ore, with the following difference. Instead of forcing reducing gas into regenerating and twyer flues, and into the ore charges, the attendant closes the gas fly valve 42, and neutral gas fly valve 57 then opens the air valve 53, thus permitting air to be drawn by vacuum into the vacuum chamber of the pressure fan 32 whence it is drawn, compressed, and driven into the flue 20, there pre-heated, and passed into twyer flue 16, and twyers 15, into and through the ore charges 13, where it imparts its heat and oxygen to the ore-charge and excess sulfur. Then, by such combination, still greater heat is produced, above that contained in the heated air, which causes very rapid desulfurization and melting of the ore charge into matte and slag, that run down over the face of the fusing ore, and take their respective places in the basin 5, from where they are withdrawn at intervals through the tap holes 6 and 7, as desired. When preheated air is being forced into and through the ore charges, its volume and heat are regulated to suit the requirements, thereby controlling the temperature of the regenerating flues and the amount of sulfur consumed.

When working very finely divided ores, as concentrates, and the like, the heated twyer air or gas is prevented from carrying out of the ore charges the fine ore particles or dust by reason of the soft, pasty crust or coating of melting mattes, metals, slags, and the like, that are always forming and always present when smelting, and which cover the complete front faces of the ore charges, close all cracks and holes therein, and arrest all ore dust and prevent it escaping from the charge into the furnace chamber. Hence a great advantage is gained by this process when smelting all grades of ores, as all ores contain fines before, and make them in, charging and heating, that cause much annoyance with the present smelting devices.

There are times when ores are to be smelted that do not contain more sulfur than is required to form a proper sulfur, iron, copper and precious metal matte, and it is not desirable to smelt them in the presence of oxidizing agents or influence. In such cases, the air valve 53 is closed, and the neutral gas valve 57 is opened, thus permitting the fan to draw neutral gas from the boiler heating chamber 26 discharging the same into the upper regenerating flue, as 20, and finally into the twyers 15 and ore charges, where they impart their mechanical heat to the ore charges, thus greatly increasing the smelting capacity of the furnace, and at the same time not oxidizing any of the sulfur contents of the ore charges. At the same time, they join with the heated gases formed by the combustion of the fuel gas and preheated air coming in at ports 17 and 18, whereby a large volume of waste heated gases is formed, keeping up the required heat in the regenerating flues.

From the above explanation it will be understood that all grades of ores can be treated successfully by this process as conditions and heat degrees can be fully controlled particularly as regards gas combination, as it is possible to obtain any character of reducing, oxidizing and neutral gases required, by regulating the valve and fan arrangements.

Of the three regenerating flues on each side of the furnace, the two employed for the regular furnace heating have been successfully employed for thirty years or more in regular regenerating steel melting furnaces and are not new, and I make no claim for them, but the third regenerating flue I claim is new, that is, the flue 20 or 20', for highly heating, under pressure, reducing, oxidizing and neutral gases which are trapped and conveyed under pressure into twyers and ore charges under the above favorable conditions, so that the gases or air, after passing through the ore charges, still contain some combustible material, which is then combusted by the unburned oxygen or hydrogen contained in the heated air or gas coming in through the ports 17 or 17', or 18 or 18'. Also, when smelting ores that contain excess sulfur over that required to form a proper matte, then, in such cases, the excess sulfur is utilized to furnish part or all of the heat required to carry on the operations, to whatever extent the excess sulfur exists. In such cases, less or no fuel gas is used to heat the furnace chamber and regenerating flues. This excess sulfur is consumed by the heated oxygen contained in the air while passing through the ore charges, in greater or less volume. There are also cases when it becomes necessary to mix with the ore charges solid reducing materials as finely divided, slack coal, coke, asphaltum, sawdust, peat, dry vegetable products, or any solid dry hydrocarbonaceous materials, and in such cases they are mixed with the ore charges while the ore and fluxes are being crushed and mixed. It may be here noted that in this process and with this apparatus the ore charge should be crushed, and in no case should they be composed of materials larger than about the size of hickory nuts, while there are no limits as to the minimum size of the particles, so that the charge may contain flue dust and the like. Hence the process and apparatus are particularly adapted to smelt fine concentrates, and the like.

When smelting charges in which are mixed solid reducing agents, as above outlined, air, reducing, or neutral gas can be used alone, or air, reducing, or neutral gases can be mixed and forced by the fan into and through the regenerator flue 20 or 20', as the case may be, into and through the twyers and ore charges, thus causing the solid reducing agents to burn and gasify and combine with the oxygen in the ores, thus generating heat and forming gases that, in turn, are completely consumed, as previously explained.

When smelting ores containing sulfur, carbonic acid gas and oxygen in varying amounts, as ores containing precious and other metals as gold, silver, copper, lead, zinc, etc., weak or strong, reducing gas is then employed to pre-heat the ore charges and to consume the oxygen and carbonic acid gas and preserve the sulfur contents of the ore for matte forming purposes and to protect the metals and matte while forming. In such a case little or no fuel gas need be admitted into the furnace chamber 4 through the port hole 18 or 18', as the case may be, but, in its stead, the reducing gas, as carbon monoxid, thus forming and issuing through and from the hot faces of the ore charges, meets and combusts the heated air then coming in the furnace chamber through the port 17 or 17'; hence sufficient heat is obtained to carry on the process.

A very important feature of this process consists of the heat reactions that take place more or less when smelting oxid ores during the deoxidizing periods. When oxids of metals are heated to a temperature of about 2500° F., but never hot enough to melt the oxids, and at the same time reducing gas, heated to about the same temperature as the ore, is brought in contact with the heated ores under pressure, a great heat is produced, which is caused by the oxygen contained in the heated ores combusting with the heated hydrocarbons contained in the reducing gas. But to produce this action successfully and completely, the operations should be carefully conducted in the following manner. After the furnace and checker work have been heated to the proper temperatures for smelting and the ore charges and the fluxes are in place in the chambers 13, air is admitted through the fan 32 and conveyed through the various pipes and valves into and through the generative flue 20 where it is pre-heated to about 2700° F. and the twyer flue 16, and finally through twyers 15 and the ore charge, thereby roasting and oxidizing any impurities contained in the ore charges, as sulfur, arsenic, and the like, and at the same time heating up the ore charge to a temperature of about 2500° F. but not to a melting heat. When the ore charge has been thoroughly heated to 2500° F. by the heated air passing through it, it really has lost little of its oxygen, owing to the fact that the air passing through it, while roasting and heating, supplies any oxygen that may have been driven out during the heating and roasting process. At this point the furnace is reversed, thus causing the fuel gas and air to discontinue passing through the ports 18 and 17, and to flow into the furnace chamber through the highly heated flues 21′ and 22′, while at this time the air valve 53 on top of the fan 32 is closed and the gas valve 42 is opened, thus permitting reducing gas, instead of air, to enter the fan vacuum chamber, whence it is forced through the discharge pipe and valve arrangements into the regenerator flue 20′, where it is highly heated to about 2700° F., finally passing into the twyer flue 16 and through the twyers 15, entering and passing into and through the roasted, heated and oxidized ore charge, where the thermic action immediately begins to take place, particularly at the hottest part of the ore charge, which is on the inner face of the ore charge, nearest the combustion chamber. The heat thus suddenly produced may reach a temperature of 4000° F., and the results are as follows: The heated reducing gas contains hydrogen and carbon, which attack and combust with the oxygen contained in the ores, causing great heat, that melts and frees the metal, while at the same time slags are formed by the association of the fluxes and earthy matters, which slag and metal flow down over faces of the ore charge, finding their respective levels according to their specific gravity in furnace basin 5, and thus a roasting and smelting process is accomplished in one operation and furnace. Oxid ores vary much in their refractory character, hence varying heats are necessary to suit the ore treated. The above description is for refractory ore. In working the apparatus and process in this manner the process is not continuous, as one side of the furnace flues are employed to heat air and gas, namely, flue 20 now heating air to roast and oxidize, flue 21 heating air for fuel purposes, and flue 22 heating fuel gas. Then the furnace reversing mechanisms are operated, and the air valve 53 is closed and the gas fly valve 42 is opened, causing reducing gas to flow through the flue 20′, fuel air through the flue 21′, and what fuel gas is required, if any, to flow through the flue 22′. About two-thirds of the ore charges will be melted while deoxidizing. While fuel gas will be needed and used when oxidizing and roasting, as above described, it will not always be used when deoxidizing, as sufficient heat may be obtained by the chemical combination to carry on the process over that period, at which time the fuel air flowing through the flue 21′ will furnish the heated air for complete combustion for any unburned gases coming through the face of ore charge until the chemical combination ceases, whereupon the furnace valve mechanism is reversed back to its first position, and then oxidizing and roasting are again carried on with the fresh ores charged.

Figure 1:
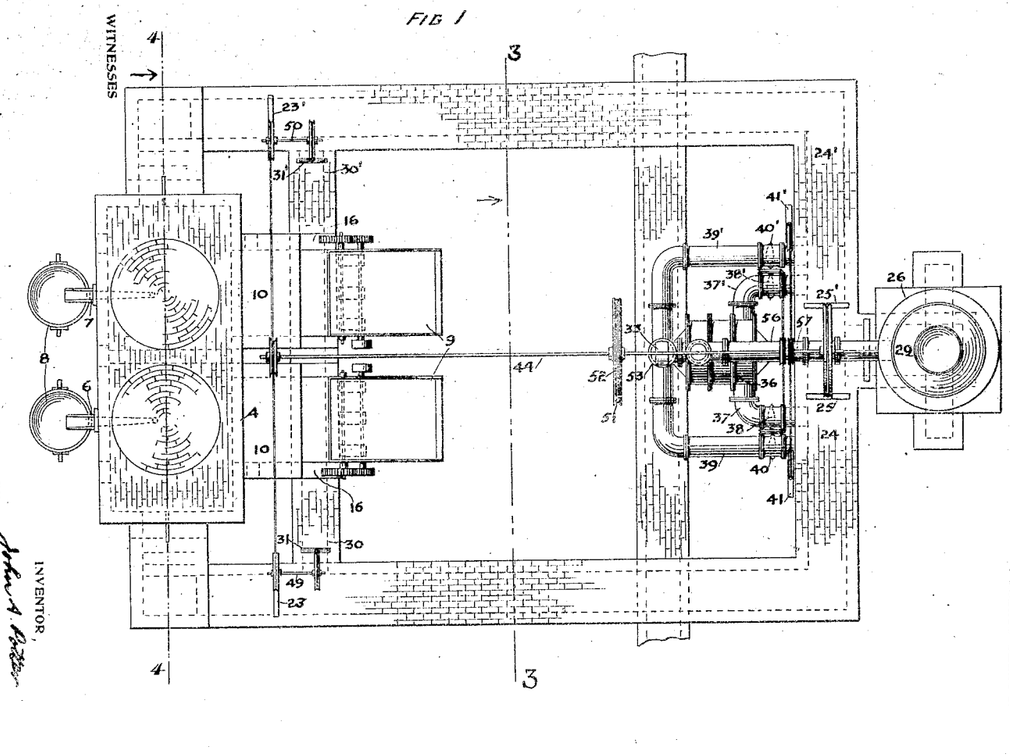
Figure 1 is a plan view of my improved apparatus.
Figure 2:
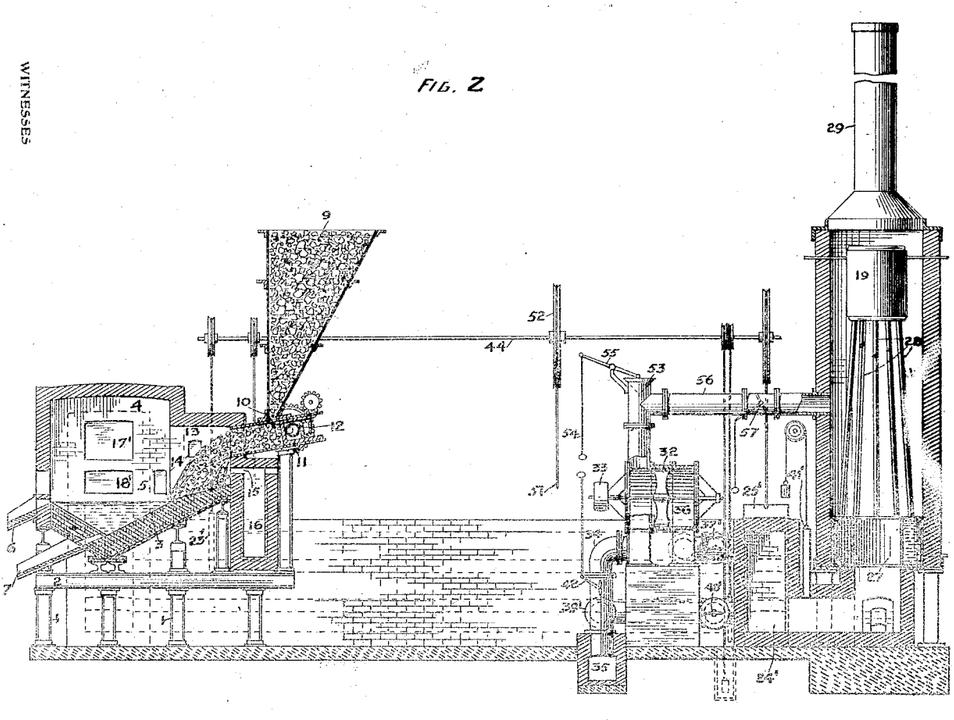
Fig. 2 is a longitudinal section thereof.
Figure 3:
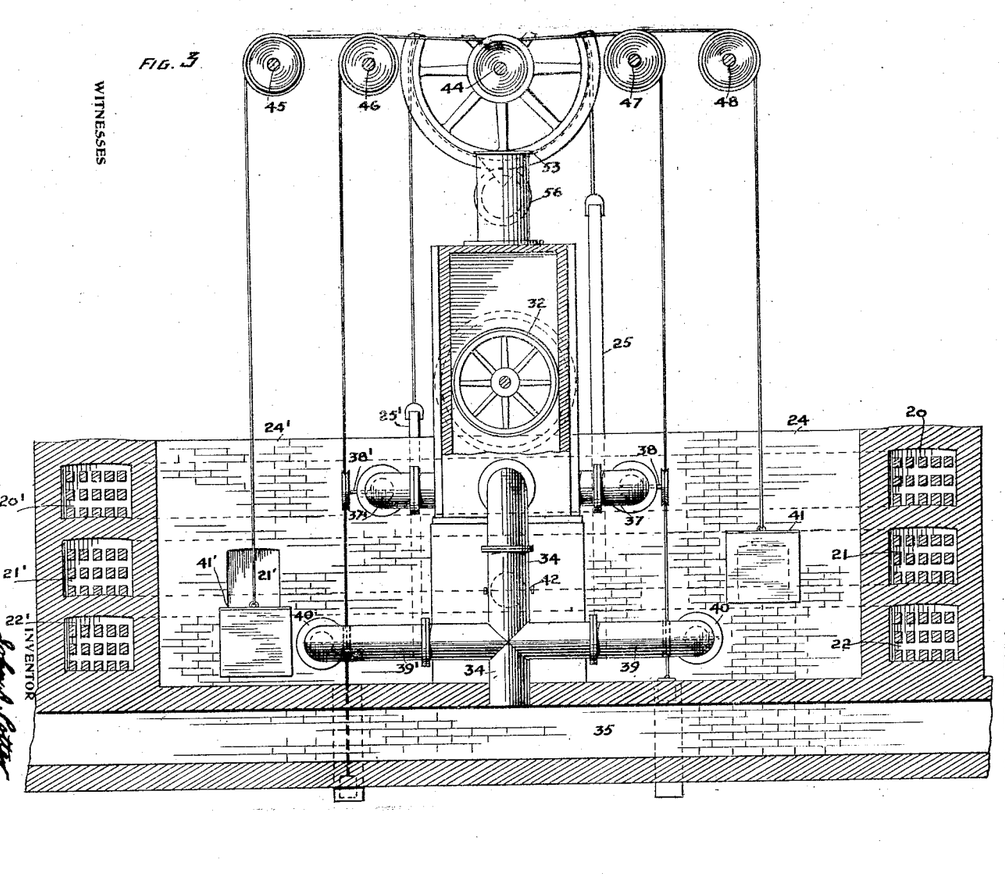
Fig. 3 is a cross section of the line 3—3 of Fig. 1.
Figure 4:
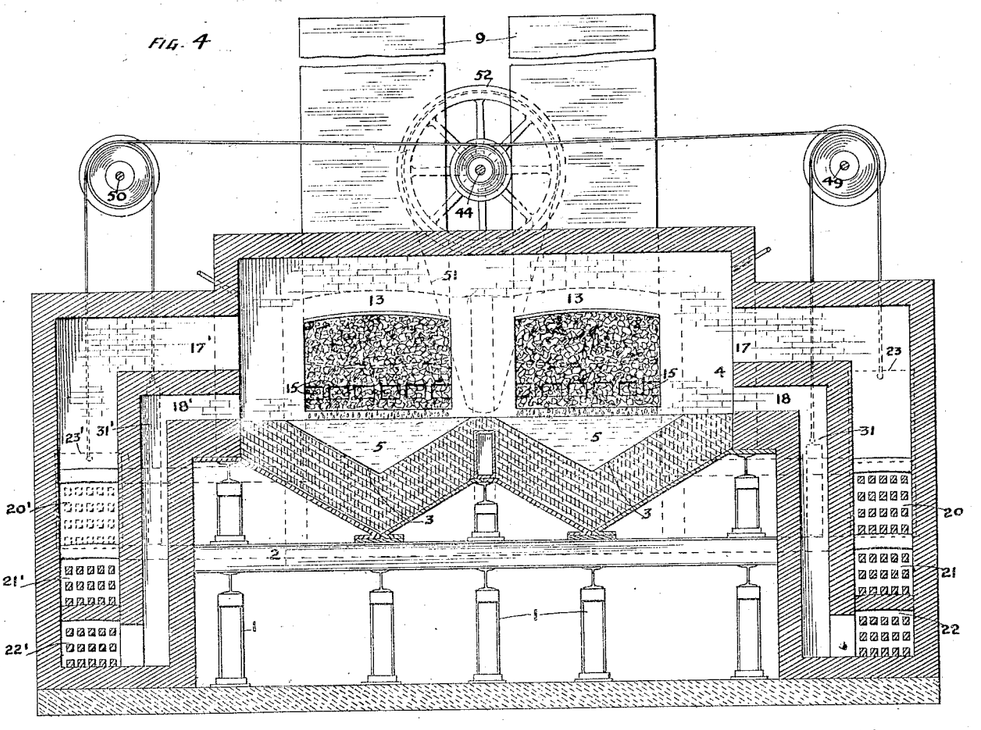
Fig. 4 is a cross section of the line 4—4 of Fig. 1.
Figures 5, 6:
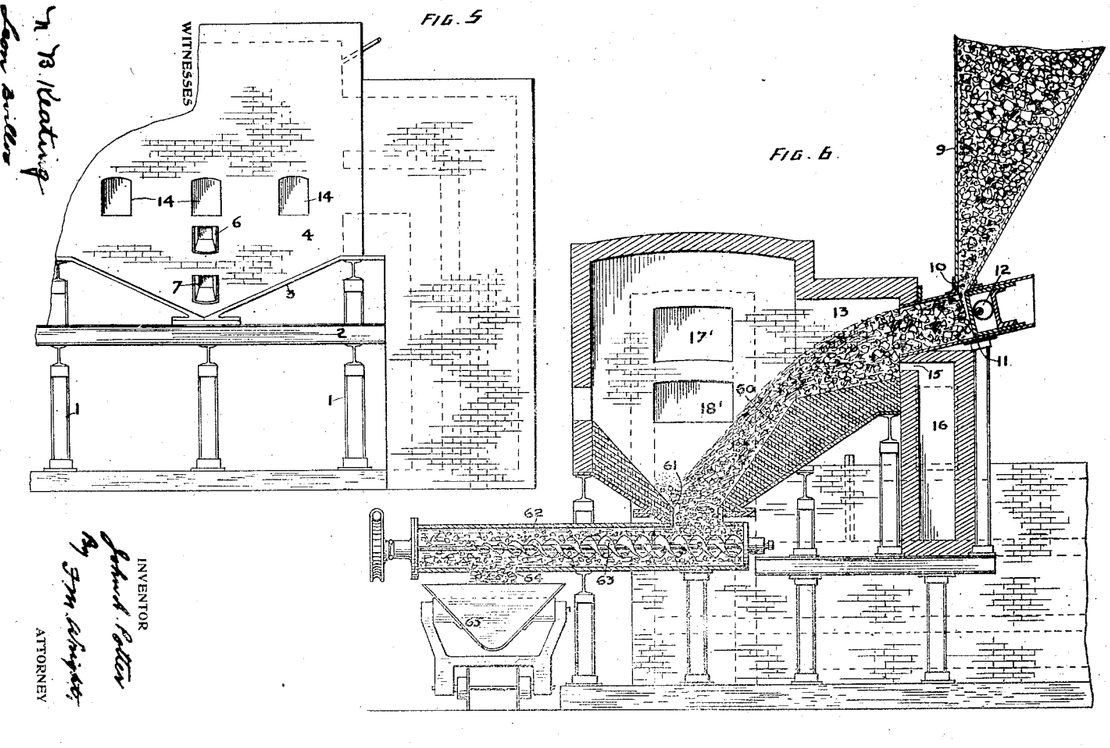
Fig. 5 is a broken front view of the apparatus.
Fig. 6 is a vertical section showing a modification of the front portion of the apparatus.

When roasting, calcining or sintering ores, mattes, earths, and the like, a furnace bottom of a modified form is used, as shown in Fig. 6. In this modification, the treated hot material treated as above described is permitted to flow or slide down over the surface of the underlying part, as shown at 60, from the roasting and heating chambers 13 and 4 following through a hole 61 in the bottom of the furnace chamber, into a discharging trough 62 whence it is conveyed forward by a worm 63 to and over an opening 64, in the bottom of the trough, whence it drops into a dump car 65, that finally disposes of the materials as desired.

When roasting ores or earths to drive off the impurities, as sulfur, arsenic and other oxidizable matters, air is introduced into the fan 32 and forced by it into pipes, valves, flues 20, or 20′ and twyers 15 as above explained, into and through the roasting materials at such temperatures as are necessary to oxidize and burn out the impurities, but not hot enough to melt the charge, while at the same time the furnace heat is adjusted to suit the occasion by adjusting and controlling the amount of fuel gas and air passing into the furnace through the regenerator flues 21 or 21′, and 22 or 22′ and ports 17 or 17′ and 18 or 18′, and thus this process is economically accomplished on a large scale.

When burning limestone, dolomite, magnesite, marl, and the like, materials which contain carbonic acid or other non-oxidizable gases, air is not used in the raw state for pre-heating, and so forth, but is diluted with reducing gas to any desired extent: or gas alone may be used, or reducing and neutral gases may be mixed to bring about a proper reducing gas and other conditions to suit the requirements.

When calcining earth and ores as above described, the furnace heats are controlled to suit the purpose, as previously described, particularly when gas, either mixed, or alone, is used. In such cases the gas, after passing through the ore charge, issues from the roasting face of the materials and is then burned by combusting with the heated air coming into the furnace chamber, through the port 17 or 17′, as the case may be.

When sintering materials (generally finely divided materials) for various purposes, the furnace heats are raised to a higher degree than that necessary for roasting or calcining, as explained above, so as to cause the corners and projecting parts of the heated materials to fuse thereby causing them to adhere to each other, as they emerge on the exposed, hottest and inner face of the sintering material, thus causing the formation of sintering materials of various sizes, the method being particularly adapted to sintering finely divided ores, earths, and the like. This treatment also deoxidizes and drives off the impurities from the clinkered ores, as sulfur, arsenic, and other impurities, this being effected by the heated oxygen contained in the air employed, thus being a very valuable result of the operation.

In some cases of roasting, calcining and sintering reducing gases, either lean or rich, may be introduced through the charge instead of air, thus bringing about a partial reduction of their oxygen or carbonic acid gases as may be desired by, first, forcing heated air through the charge to burn and oxidize its oxidizable contents, and then, by shifting and reversing the valves 42 and 53, gas is caused to take the place of air, so that a reducing gas is now passed through the heated oxidized charge, and combines with the oxygen thereof, while the gases, weaker in oxygen, as monoxid, issue from the charge face into the combustion chamber, where they are burned, and thus assist in maintaining the heat necessary to carry on the process. This procedure is very desirable when burning limestone containing sulfur, and the like, also when calcining and sintering ores, earths, and the like. Also when sintering finely divided precious metal ores, or the like, gas may be used alone so as to prevent the oxidization of metals contained; also neutral gas can be used to sinter ores and preserve the metals.

It is to be understood that, in my invention, I contemplate the employment of a furnace containing one or more deoxidizing or desulfurizing chambers under the same roof.

I claim:—

1. In an apparatus of the character described, the combination of a furnace, a deoxidizing chamber opening into said furnace, a stack, two series of regenerative flues arranged to conduct waste gases from the furnace to the stack, a conduit leading from a flue of each series to said deoxidizing chamber to conduct gas thereto, a conduit for supplying combustible gas, an air supply conduit, and valves for each series, adapted to be arranged in one position to permit the waste gases to pass through said flues from the furnace to the stack and in another position to permit air and combustible gas to pass from said supply conduits to the furnace and deoxidizing chamber, substantially as described.

2. In an apparatus of the character described, the combination of a furnace, a deoxidizing chamber opening into said furnace, a twyer chamber adjacent to said deoxidizing chamber and having twyers leading therefrom into said deoxidizing chamber, means for charging ore into said deoxidizing chamber, a stack, two series of regenerative flues arranged to conduct waste gases from the furnace to the stack, a conduit leading from a flue of each series to said twyer chamber to conduct gas thereto, a conduit for supplying combustible gas, an air supply conduit, and valves for each series, adapted to be arranged in one position to permit the waste gases to pass through said flues from the furnace to the stack and in another position to permit air and combustible gas to pass from said supply conduits to the furnace and twyer chamber, substantially as described.

3. In an apparatus of the character described, the combination of a furnace, a deoxidizing chamber opening into said furnace, a twyer chamber adjacent said deoxidizing chamber and having twyers leading therefrom into said deoxidizing chamber, means for charging ore into said deoxidizing chamber, a stack, two series of regenerative flues arranged to conduct waste gases from the furnace to the stack, a conduit leading from a flue of each series to said twyer chamber to conduct gas thereto, a conduit for supplying combustible gas, an air supply conduit, and valves for each series, adapted to be arranged in one position to permit the waste gases to pass through said flues from the furnace to the stack and in another position to permit combustible gas to pass to the deoxidizing chamber and combustible gas and air to pass to the furnace, substantially as described.

4. In an apparatus of the character described, the combination of a furnace, a deoxidizing chamber opening into said furnace, a twyer chamber adjacent said deoxidizing chamber and having twyers leading therefrom into said deoxidizing chamber, means for charging ore into said deoxidizing chamber, a stack, two series of regenerative flues arranged to conduct waste gases from the furnace to the stack, a conduit leading from a flue of each series to said twyer chamber to conduct gas thereto, a conduit for supplying combustible gas, an air supply conduit, valves for each series, adapted to be arranged in one position to permit the waste gases to pass through said flues from the furnace to the stack and in another position to permit air and combustible gas to pass from said supply conduits to the furnace and deoxidizing chamber, and a fan for forcing air and combustible gas along flues to said furnace, substantially as described.

5. In an apparatus of the character described, the combination of a furnace, a deoxidizing chamber opening into said furnace, a twyer chamber adjacent said deoxidizing chamber and having twyers leading therefrom into said deoxidizing chamber, means for charging ore into said deoxidizing chamber, a stack, two series of regenerative flues arranged to conduct waste gases from the furnace to the stack, a conduit leading from a flue of each series to said twyer chamber to conduct gas thereto, a conduit for supplying combustible gas, an air supply conduit, valves for each series, adapted to be arranged in one position to permit the waste gases to pass through said flues from the furnace to the stack and in another position to permit combustible gas to pass to the deoxidizing chamber and combustible gas and air to pass to the furnace, and a fan for forcing combustible gas to said deoxidizing chamber and air to said furnace, substantially as described.

6. In an apparatus of the character described, the combination of a furnace, a deoxidizing chamber opening into said furnace, means for charging ore into said deoxidizing chamber, a stack, two series of regenerative flues arranged to conduct waste gases from the furnace to the stack, a conduit leading from a flue of each series to said deoxidizing chamber to conduct gas thereto, a conduit for supplying combustible gas, an air supply conduit, valves for each series, adapted to be arranged in one position to permit the waste gases to pass through said flues from the furnace to the stack and in another position to permit air and combustible gas to pass from said supply conduits to the furnace and deoxidizing chamber, a conduit leading from said stack to said flues, and a valve in said conduit permitting neutral gases to pass from the stack to the flues with the combustible gas and air, substantially as described.

7. In an apparatus of the character described, the combination of a furnace, a deoxidizing chamber opening into said furnace, means for charging ore into said deoxidizing chamber, a stack, two series of regenerative flues arranged to conduct waste gases from the furnace to the stack, a conduit leading from a flue of each series to said deoxidizing chamber to conduct gas thereto, a conduit for supplying combustible gas, an air supply conduit, valves for each series, adapted to be arranged in one position to permit the waste gases to pass through said flues from the furnace to the stack and in another position to permit air and combustible gas to pass from said supply conduits to the furnace and deoxidizing chamber, a fan for forcing air and combustible gas along flues to said furnace, and a conduit leading from said stack to the inlet side of said fan, substantially as described.

8. In an apparatus of the character described, the combination of a furnace, a deoxidizing chamber opening into said furnace, means for charging ore into said deoxidizing chamber, a stack, two series of regenerative flues arranged to conduct waste gases from the furnace to the stack, a conduit leading from a flue of each series to said deoxidizing chamber to conduct gas thereto, a conduit for supplying combustible gas, an air supply conduit, valves for each series, adapted to be arranged in one position to permit the waste gases to pass through said flues from the furnace to the stack and in another position to permit air and combustible gas to pass from said supply conduits to the furnace and deoxidizing chamber, and means for opening the valves on one side of the flues and closing those on the other, and conversely, substantially as described.

9. The process of treating ores which consists in passing waste gases from a furnace to a stack through a series of flues to highly heat the same, then closing the passage through said flues to the stack to prevent passage of said waste gases, and passing in the reverse direction, through one of said flues fuel gas to the lower part of said furnace, through another of said flues air into the upper part of said furnace, and through the third of said flues reducing gas, discharging said gas into a reducing chamber, continuously feeding ore into said reducing chamber in front of the discharge opening of said reducing gas, and applying the heat of combustion of the fuel gas in said furnace to assist said reducing gas in melting the ores in said reducing chamber, then conducting the waste gases so derived through a similiar series of regenerative flues to highly heat said flues, and then reversing the direction through the latter flues in the manner above described for the first mentioned flues, substantially as described.

10. The process of reducing ore which consists in utilizing the waste gases of the furnace to heat three regenerative flues, then preventing the escape of waste gases through said flues, and passing in the reverse direction, through two of said flues respectively, fuel gas and compressed air, and maintaining the said gas and air separate until they meet and combine in the furnace, continuously charging ore into a furnace in such a direction that the front face of the charge is exposed to the flames of combustion of said fuel gas by said air, passing through the third flue reducing gas under pressure, and passing the gas thus highly heated into and through said charge, substantially as described.

In testimony whereof, I have hereunto set my hand in the presence of two subscribing witnesses.

JOHN A. POTTER.

Witnesses:
LUCY E. WHEELER,
H. I. HUSSEY.